(12) United States Patent
Stöger

(10) Patent No.: US 9,479,419 B2
(45) Date of Patent: Oct. 25, 2016

(54) SELF-ORGANISING METHOD FOR ESTABLISHING DETERMINISTIC ROUTES IN A LARGE COMPUTER NETWORK

(71) Applicant: FTS Computertechnik GmbH, Vienna (AT)

(72) Inventor: Georg Stöger, Vienna (AT)

(73) Assignee: FTS Computertechnik GMBH, Vienna (AT)

( * ) Notice: Subject to any disclaimer, the term of this patent is extended or adjusted under 35 U.S.C. 154(b) by 44 days.

(21) Appl. No.: 14/395,289

(22) PCT Filed: Apr. 19, 2013

(86) PCT No.: PCT/AT2013/050092
§ 371 (c)(1),
(2) Date: Oct. 17, 2014

(87) PCT Pub. No.: WO2013/155547
PCT Pub. Date: Oct. 24, 2013

(65) Prior Publication Data
US 2015/0078205 A1 Mar. 19, 2015

(30) Foreign Application Priority Data
Apr. 19, 2012 (AT) .................................. A 474/2012

(51) Int. Cl.
*H04L 12/751* (2013.01)
*H04L 12/725* (2013.01)
(Continued)

(52) U.S. Cl.
CPC ............... *H04L 45/02* (2013.01); *H04L 45/10* (2013.01); *H04L 45/302* (2013.01); *H04L 47/724* (2013.01); *H04L 47/826* (2013.01); *H04L 49/25* (2013.01)

(58) Field of Classification Search
CPC ... H04L 45/02; H04L 45/302; H04L 47/724; H04L 47/826
USPC .................................. 370/254–255, 464–465
See application file for complete search history.

(56) References Cited

U.S. PATENT DOCUMENTS 5,566,171 A * 10/1996 Levinson ................ H04L 12/52
370/249
6,145,008 A * 11/2000 Kopetz .................. G06F 13/387
370/476

(Continued)

FOREIGN PATENT DOCUMENTS

EP        0762799      3/1997
WO    WO 01/88746    11/2001

OTHER PUBLICATIONS

Andreica et al., "Fairness and QoS Enhancement Models and Techniques for Peer-to-Peer Content Sharing Systems", 2009 11th International Symposium on Symbolic and Numeric Algorithms for Scientific Computing (SYNASC); IEEE, Piscataway, NJ; Sep. 26, 2009; 8 pages.

(Continued)

*Primary Examiner* — Warner Wong
(74) *Attorney, Agent, or Firm* — Blank Rome LLP

(57) ABSTRACT

The invention relates to a method for establishing deterministic communication routes in a large computer network, wherein all affected end systems and switches of the computer network have a global time and a deterministic communication route is generated on the basis of an existing communication route between two or more end systems of the computer network in that a time-triggered connection manager (TTCM) of an end system
reserves the deterministic communication route in a reservation phase by sending a reservation message to each network switch of the existing communication route up to the reservation commitment time (KZPT), and then confirms this deterministic communication route in an accept phase by sending an accept message to the network switches of the existing communication route before the KZPT.

20 Claims, 1 Drawing Sheet

(51) Int. Cl.
*H04L 12/911* (2013.01)
*H04L 12/913* (2013.01)
*H04L 12/947* (2013.01)

(56) References Cited

U.S. PATENT DOCUMENTS

| | | | |
|---|---|---|---|
| 6,611,531 B1* | 8/2003 | Chen | H04L 12/6418 370/420 |
| 8,396,022 B1* | 3/2013 | Lindsay | H04L 45/34 370/321 |
| 2007/0140294 A1* | 6/2007 | Takatori | H04L 12/40032 370/466 |
| 2009/0279651 A1* | 11/2009 | Ungermann | H04J 3/0652 375/356 |
| 2011/0138080 A1* | 6/2011 | Steiner | H04J 3/0664 709/248 |

OTHER PUBLICATIONS

Wang et al., "Interfering-aware QoS multipath routing for ad hoc wireless network", Advanced Information Networking and Applications, 2004; AINA 2004; 18th H International Conference on Fukuoka, Japan, Mar. 29-31, 2004; IEEE, Piscataway, NJ; vol. 1; Mar. 29, 2004; 6 pages.
Chavez et al., "Challenger: a multi-agent system for distributed resource allocation", Proceedings of the First International Conference on Autonomous Agents Marina Del Rey, CA: Feb. 5-8, 1997; vol. conf. 1, Feb. 5, 1997; 10 pages.
Kopetz et al., "The Time-Triggered Ethernet (TTE) Design", Object-Oriented Real-Time Distributed Computing, 2005; International Symposium on Seattle WA; May 18-20, 2005; IEEE, Piscataway, NJ; 12 pages.
International Search Report dated Aug. 30, 2013; International Application No. PCT/AT2013/050092; International Filing Date Apr. 19, 2013; 3 pages (w/3—page translation).
Clark, D. "The Design Philosophy of the DARPA Internet Protocols", Computer Communication Review. vol. 18(4). (pp. 106-114), 1988; 9 pages.
SAE Standard AS6802; "Time-Triggered Ethernet"; URL: http://standards.sae.org/as6802; Nov. 2011; 108 pages.
IEEE 1588 Standard for a Precision Clock Synchronization Protocol for Network Measurement and Control Systems; IEEE Instrumentation and Measurement Society; URL: http://www.ieee1588.com/; Jul. 24, 2008; 289 pages.
Kopetz, H., Real-Time Systems—Design Principles for Distributed Embedded Applications; Springer Publishing House; 2011; 396 pages.

* cited by examiner

SELF-ORGANISING METHOD FOR ESTABLISHING DETERMINISTIC ROUTES IN A LARGE COMPUTER NETWORK

FIELD OF THE INVENTION

The invention relates to a method for establishing deterministic communication routes in a large computer network, wherein all affected end systems and switches of the computer network have a global time.

The invention also relates to such a computer network and to end systems and switches of such a computer network.

INTRODUCTION

The present invention lies in the field of computer technology. The invention describes an innovative method for establishing time-controlled (time-triggered) routes in a large computer network in accordance with a self-organising method.

In many applications of large computer networks, the availability of a deterministic communication route with guaranteed bandwidth and minimal delay of the messages between end systems is advantageous. For example, the immediacy of the response to a request of the remote partner is a key parameter of the service quality (QoS) in a video-conference system. In a smart grid, in which periodic sensor data has to be transmitted over long physical distances, the transmission duration between the decentral sub-systems and the central control room determines, to a significant extent, the dead time of a control circuit closed via the communication system and therefore the quality of the control.

A large computer network is generally understood to mean a network in which there is no central authority controlling the entire network. An example for a large computer network is the Internet.

A minimal delay—and therefore the optimal latency—of a transmission along a given route is achieved when the transmission paths of a message are phase-synchronous along this route, which is formed of transmission segments and switches. Unnecessary residence times of the messages in the communication system are thus prevented. Such a phase-synchronous transmission of the messages requires all affected end systems and switches to have a global time with known precision. This time base is to be fault-tolerant [6].

OBJECT OF THE INVENTION

The object of the present invention is to dynamically establish a deterministic time-controlled communication route between two or more end systems along a given route for a data stream in a large computer network by means of a decentralised self-organising method.

This object is achieved with a method as mentioned in the introduction in that, in accordance with the invention, a deterministic communication route is generated on the basis of an existing communication route between two or more end systems of the computer network in that a time-triggered connection manager (TTCM) of an end system reserves the deterministic communication route in a reservation phase by sending a reservation message to each network switch of the existing communication route up to the reservation commitment time (KZPT), and then confirms this deterministic communication route in an accept phase by sending an accept message to the network switches of the existing communication route before the KZPT.

It is particularly advantageous here if the time-triggered connection manager (TTCM) of an end system firstly tests the feasibility of the deterministic communication route with respect to the respective network switch in a request phase, before the reservation phase, by sending requests to each network switch, then reserves the deterministic communication route in a reservation phase by sending a reservation message to each network switch of the existing communication route up to the KZPT, and then confirms this deterministic communication route in an accept phase by sending an accept message to the network switches of the existing communication route before the KZPT.

To solve the above-stated object, in accordance with the invention the parameters of the desired time-controlled route (start time of the provision of the route, end time of the provision of the route, desired bandwidth) are determined by the requesting end system and are communicated to the switches provided in the route. The switches check which time-controlled service quality can be provided in the requested time interval and reserve this service up to a commitment time (KZPT) contained in the request, that is to say the moment up to which the reservation is guaranteed. Here, depending on the utilisation of the switches, a different residence period of the messages in the individual switches may occur. In an iterative method, it is now attempted to minimise the residence periods of the messages in the switches by changing the phase position and the message length, such that a good service quality is achieved. When the requesting end system accepts the guaranteed service quality, it must output a binding service order by means of an accept message before the KZPT and can then use this service in the reserved interval.

Neither the patent literature [1-5] nor the academic literature discloses information concerning the dynamic structure of a time-controlled route in a large computer network, such as the Internet.

SUMMARY OF THE INVENTION

The present invention thus discloses an innovative method for dynamically establishing a deterministic route with specified service parameters along an existing route in a large computer network. Here, there is no precondition of a central planning authority. In a self-organising method, the switches arranged along the route calculate the parameters of the time-controlled route corresponding to the request.

Further advantageous embodiments of the method according to the invention are described hereinafter and can be provided additionally, alternatively or in any combination with one another. Here, it may be that each network switch independently performs the reservation up to the KZPT in accordance with the reservation message directed thereto from the TTCM and communicates the guaranteed TVD in the provision period and also the NVD and proposals for reducing the TVD to the requesting TTCM, and, following acceptance of the reservation by the TTCM by means of an accept message, confirms the reservation by sending an accept reply message to the TTCM;

a switch rejects a reservation when it has not received an accept message from the TTCM requesting the reservation before the KZPT;

a switch deletes a reservation for a time-controlled route after the EZPT;

the TTCM modifies the reservation request on the basis of the information concerning the quality of the route and proposals for reducing the TVD received by the TTCM from the switches involved in the route and prompts further iterations in order to establish a time-controlled route via the same switches;

the TTCM cancels the iterations when a sought-after quality of the route has been achieved or when a maximum number of iterations has been executed;

the time-controlled route has a multi-point topology;

in a large network a number of TTCMs can establish deterministic communication routes at the same time, and the requests of the TTCMs are processed in the switched in accordance with the temporal order of the BZPT of the reservation message;

a switch, due to a reservation message having a later BZPT which conflicts with a reservation having an earlier BZPT, cancels the reservation having the later BZPT;

the message traffic between the TTCM and the switches is secured by cryptographic methods.

The object stated in the introduction is additionally achieved by a network switch for use in an above-described method and by a TTCM for use in an above-mentioned method.

The TTCM is preferably part of an end system.

The object is additionally achieved by a computer network, in particular a large computer network comprising end systems and switches, which is configured to carry out an above-described method.

BRIEF DESCRIPTION OF THE DRAWING

The present invention will be explained in more detail on the basis of the following drawing, in which.

DETAILED DESCRIPTION OF THE INVENTION

Figure 1:
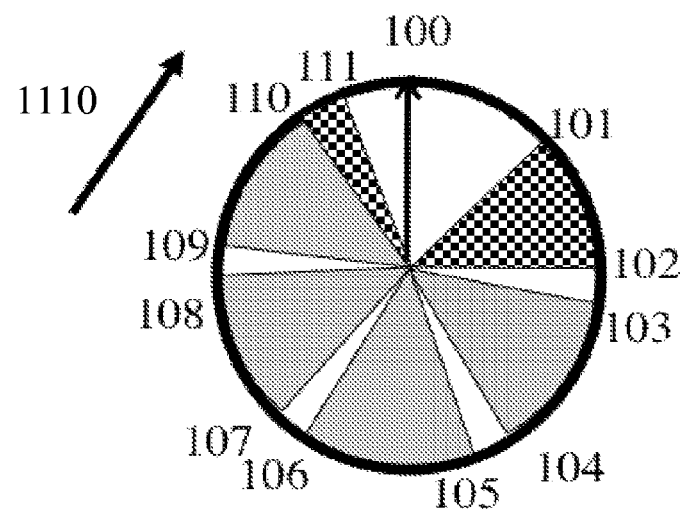
FIG. 1 shows a cyclical illustration of the progress of real time.

FIG. 1 shows the progress of real time in cycles. In this illustration, the progress of real time is illustrated in the form of periods and phases, In FIG. 1 time proceeds in the clockwise direction 1110. The start of a period is synchronised at the time 100 with the global time. An event that occurs within a period (for example the event 101) is characterised by the specification of the angle, that is to say the phase, between the start of the period 100 and the event 101. When the time has passed through a full period—that is to say an angle of 360 degrees—the subsequent period thus starts. In the subsequent period, the time-controlled actions have the same phase as in the previous period. The cyclical image of the progress of real time is particularly well suited for illustrating periodic processes as occur in time-controlled real-time systems.

Figure 2:
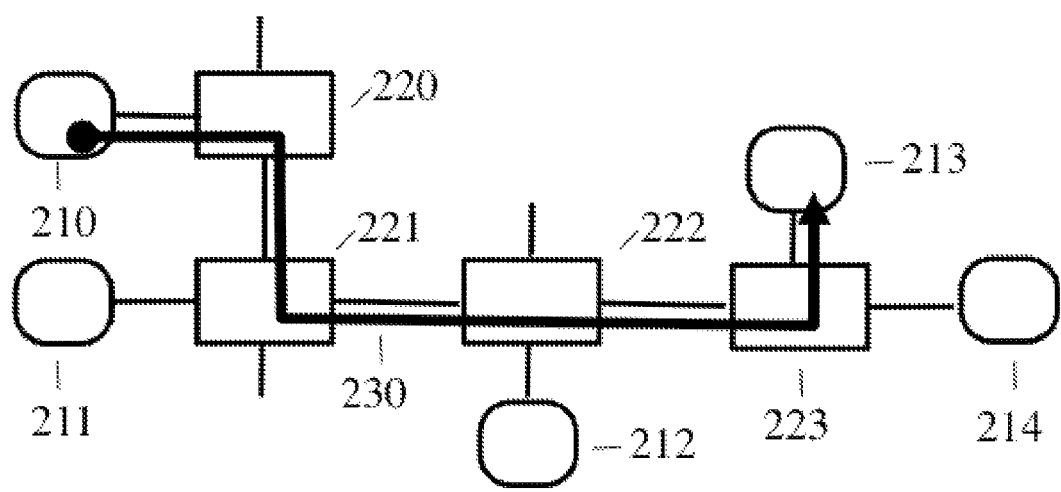
FIG. 2 shows the structure of a small part of a large network and a route between two end systems.

FIG. 2 shows a small part of a large computer network. In FIG. 2 the five end systems 210, 211, 212, 213, 214 and the four switches 220, 221, 222, 223 are illustrated. In addition, the route 230 from the end system 210 via the switches 220, 221, 222, 223 to the end system 213 is shown in in FIG. 2.

The progress of a message transmission over time along the route 130 is illustrated in FIG. 1. At the time 101, the end system 210 (the transmitting computer node) starts with the transmission of a message. At the time 102, following the start latency, the first bit of this message arrives at the switch 220. The message resides in the switch up to the time 103, at which the first bit of the message leaves the switch 220 in the direction of the switch 221. At the time 104, the first bit of the message arrives at the switch 221. The period between the event 102 and the event 104 is referred to in a simplified manner as the residence time of the message in the switch 102. This term (residence time) not only comprises the actual residence time in the switch, but also the time for the transport of the first bit of the message via the communication channel to the following message receiver. The described procedure, repeated up to the time 108, at which the message arrives at the switch 223 immediately before the receiving end system 213. Following the residence time in the switch 223, the first bit of the message arrives at the end system 213 at the time 110. The transmission of the message is concluded at the time 111, that is to say the time at which the last bit of the message has arrived at the end system 213. The interval (110, 111) is referred to as end latency.

Further terms that are used in this document will be explained hereinafter. A time-controlled route between two end systems is characterised by the exact specification of the phase and period [sec] at the start of the route, the phase and period at the end of the route, and the length [bit] of a time-controlled message. These parameters determine the real-time properties of a route. The bandwidth [bit/second] of the time-controlled route is given from bandwidth=(length of a message)/period.

A desired bandwidth can be achieved either by short messages with short period (or high frequency) or longer messages with longer periods.

A time-controlled route is structured in physical segments, which are connected via switches. The physical bandwidths along a time-controlled route may be different in the individual segments. The minimum period required by the first bit of a time-controlled message in order to pass from arrival in one switch to arrival in the subsequent switch (or the end system) is referred to as the necessary residence time of the message (NVD) in the switch. The actual residence time required by a time-controlled message in order to pass from arrival in one switch to arrival in the subsequent switch (or the end system) is referred to as the actual residence time (TVD) of the message in the switch. The difference between the necessary residence time and the actual residence time is referred to as the slack of the message. In an optimal time-controlled route, the sum of the slacks in all switches is equal to zero.

When there is a direct physical connection between the end systems, the latency of a message transmission is given by latency=start latency+end latency The latency of a time-controlled message along a time-controlled route with N switches is given over channels with identical physical bandwidth by actual latency=start latency+TVD in all N switches+ end latency minimal latency=start latency+NVD in all N switches+end latency The quality of a time-controlled route is expressed by the ratio quality=(actual latency)/(minimal latency).

In the ideal case, this ratio is one.

When the end system 210 intends to establish a time-controlled route for a data stream along the route 230, the following three-stage method is preferably performed.

In the first phase (start phase), the time-triggered connection manager (TTCM) of the end system 210 sends a non-binding request with following content to all switches arranged in the route
- desired time-controlled bandwidth of the route
- start time of the provision of the route AZPT
- end time of the provision of the route EZPT The switches arranged in the route, that is to say in FIG. 2 the four switches 220, 221, 222, 223 check which TWD the switch can guarantee in the provision time (that is to say the interval between the start time (AZPT) of the provision of the route and the end time of the provision of the route (EZPT)) and which NVD would be possible in the best case. The TTCM decides on the basis of this information whether an establishment of a time-controlled route along the existing route appears to be expedient or whether a new route has to be sought.

When the TTCM decides to establish a time-controlled route along the existing route, the second phase (reservation phase) thus starts. The TTCM sends a reservation message with the following content
- desired time-controlled bandwidth of the route
- start time of the provision of the route AZPT
- end time of the provision of the route EZPT
- commitment time of the reservation KZPT
- formation time BZPT of the reservation message
- start phase and start message length to all switches arranged in the route. The formation time of the reservation message BZPT is the time at which the reservation message was formed. The switches arranged in the route, that is to say in FIG. 2 the four switches 220, 221, 222, 223, process this reservation message sequentially in the order in which they occur in the route 230 and reserve the time-controlled connection for the provision time. The last switch in the route from the view of the TTCM, that is to say switch 223 in FIG. 2, communicates the successful reservation to the TTCM by means of a confirmation message, in which the guaranteed TVD and NVD in each switch of the route is contained. Furthermore, any switch may present proposals for reducing the TVD in this switch by changing the phase and period (or the message length). After receipt of this information by the TTCM, the TTCM can change the phase and message length in order to reduce the TVDs in the switches in a next iteration of the reservation.

When the quality of the connection has reached a previously determined level of quality or when a maximum number of iterations has been executed, the TTCM transmits the result to the end user for the decision.

When the end user accepts the result, the third phase (accept phase) then starts. In the accept phase, an accept message is transmitted by the TTCM to all involved switches before the KZPT in order to confirm the reservation of the time-controlled route. The switch responds with an accept reply message. When no accept message arrives at a switch before the KZPT, the (preliminary) reservation is deleted.

When a time-controlled route for the specified provision period has been reserved, the route from the switch to the EZPT is deleted autonomously (that is to say at the end of the provision period).

When a route does not have a point-to-point, but a multi-point topology, the TTCM thus receives the information of all switches arranged in the multi-point route. The TTCM then decides whether a further iteration is necessary on the basis of this information.

In a large network, in which many end users and switches are provided, a number of TTCMs may be active simultaneously. A deadlock may be reached as a result of uncoordinated parallel reservations. The deadlock is prevented by placing all reservations in a temporal order on the basis of the formation time BZPT of the reservation message contained in the reservation message. When a reservation in a switch, due to a reservation message having a later BZPT, is in conflict with a reservation having an earlier BZPT, the reservation having the later BZPT is thus to be cancelled by the switch. Due to the global time provided, all decisions in the network can thus be placed in a temporal order consistently, such that conflicts can be resolved consistently. Simultaneity can be eliminated by placing the TTCMs in a sequence.

In order to prevent an intruder from falsely making reservations, the reservation traffic between the TTCM and the switches can be secured by cryptographic methods.

The proposed innovative method functions in accordance with the fate-sharing model of Clark [7], which mandates that all key state data of a connection are managed in the endpoints of the connection and there is no central authority in the network managing all time-controlled connections. The method builds on the published standards of Ethernet, TT Ethernet [1,8] and IEEE 1588 clock synchronisation [9] and can therefore be incorporated into existing networks without substantial modifications.

The method disclosed here for self-organising establishment of time-controlled routes in a large computer network brings large economical advantages, since the quality and therefore the applicability of modern network technology is considerably extended.

ABBREVIATIONS USED

| | |
|---|---|
| AZPT | start time of the provision time |
| BZPT | formation time of the reservation message |
| EZPT | end time of the provision period |
| KZPT | commitment time of the reservation |
| NVD | necessary residence period of a TT message in a switch |
| TT | time-triggered |
| TTCM | time-triggered connection manager |
| TVD | actual residence time of a TT message in a switch |

CITED LITERATURE

[1] U.S. Pat. No. 7,839,868. Kopetz, H. Communication method and system for the transmission of time-driven and event-driven Ethernet messages. Granted Nov. 23, 2010.

[2] US 20100220744, Ungerman, J., Intelligent Star Coupler for time-triggered communication protocol and method for communicating between nodes with a network using a time triggered protocol. Publication Date Sep. 2, 2010.

[3] US 20060242252, Jiang, S., Extensible Scheduling of Messages on Time-Triggered Busses. Publication Date Oct. 26, 2006.

[4] US 20110066854; Poledna, S., Method for Secure Dynamic Bandwidth Allocation in TT Ethernet. Publication Date Mar. 17, 2011

[5] US 20110032833 Zhang et al. Optimizing of Traffic Routing for Data Center Services. Publication Date Feb. 10, 2011

[6] Kopetz, H. Real-Time Systems, Design Principles for Distributed Embedded Applications. Springer Publishing House. 2011.

[7] Clark, D. (1988). The Design Philosophy of the DARPA Internet Protocols. Computer Communication Review. Vol. 18(4). (pp. 106-114).

[8] SAE Standard AS6802 von TT Ethernet. URL: http://standards.sae.org/as6802

[9] IEEE 1588 Standard for a Precision Clock Synchronization Protocol for Network Measurement and Control Systems. URL: http://www.ieee1588.com/

The invention claimed is:

1. A method for establishing deterministic communication routes in a large computer network, wherein all affected end systems and switches of the computer network have a global time, the method comprising steps of:
generating a deterministic communication route on the basis of an existing communication route between two or more end systems of the computer network;
testing, by a time-triggered connection manager (TTCM) of an end system, feasibility of the deterministic communication route with respect to a respective network switch in a request phase, by sending requests to each network switch along the existing communication route;
reserving, by the time-triggered connection manager (TTCM) of an end system, the deterministic communication route in a reservation phase by sending a reservation message to each network switch of the existing communication route up to a reservation commitment time (KZPT); and
confirming, by the time-triggered connection manager (TTCM) of the end system, this deterministic communication route in an accept phase by sending an accept message to the network switches of the existing communication route before the KZPT.

2. The method according to claim 1, wherein each network switch independently performs the reservation up to the KZPT in accordance with the reservation message directed thereto from the TTCM and communicates a guaranteed actual residence time (TVD) in a provision period and also a necessary residence time (NVD) and proposals for reducing the TVD to the requesting TTCM, and, following acceptance of the reservation by the TTCM by means of an accept message, confirms the reservation by sending an accept reply message to the TTCM.

3. The method according to claim 1, wherein a switch rejects a reservation when it has not received an accept message from the TTCM requesting the reservation before the KZPT.

4. The method according to claim 1, wherein a switch deletes a reservation for a time-controlled route after the EZPT.

5. The method according to claim 1, wherein the TTCM modifies the reservation request on the basis of the information concerning the quality of the route and proposals for reducing the TVD received by the TTCM from the switches involved in the route and prompts further iterations in order to establish a time-controlled route via the same switches.

6. The method according to claim 1, wherein the TTCM cancels iterations when a sought quality of the route has been achieved or when a maximum number of iterations has been run through.

7. The method according to claim 1, wherein the time-controlled route has a multi-point topology.

8. The method according to claim 1, wherein in the large computer network a number of TTCMs can establish deterministic communication routes at the same time, and the requests of the TTCMs are processed in the switches in accordance with the temporal order of the BZPT of the reservation message.

9. The method according to claim 1, wherein a switch, due to a reservation message having a later BZPT which conflicts with a reservation having an earlier BZPT, cancels the reservation having the later BZPT.

10. The method according to claim 1, wherein the message traffic between the TTCM and the switches is secured by cryptographic methods.

11. A network switch for use in a method according to claim 1.

12. A TTCM for use in a method according to claim 1.

13. The TTCM according to claim 12, wherein the TTCM is part of an end system.

14. An end system comprising a TTCM according to claim 13.

15. A computer network, in particular a large computer network comprising end systems and switches, for carrying out a method according to claim 1.

16. A method for establishing deterministic communication routes in a large computer network, wherein all affected end systems and switches of the computer network have a global time, the method comprising steps of:
generating a deterministic communication route on the basis of an existing communication route between two or more end systems of the computer network;
reserving, by a time-triggered connection manager (TTCM) of an end system, the deterministic communication route in a reservation phase by sending a reservation message to each network switch of the existing communication route up to a reservation commitment time (KZPT); and
confirming, by the time-triggered connection manager (TTCM) of the end system, this deterministic communication route in an accept phase by sending an accept message to the network switches of the existing communication route before the KZPT;
wherein each network switch independently performs the reservation up to the KZPT in accordance with the reservation message directed thereto from the TTCM and communicates a guaranteed actual residence time (TVD) in a provision period and also a necessary residence time (NVD) and proposals for reducing the TVD to the requesting TTCM, and, following acceptance of the reservation by the TTCM by means of an accept message, confirms the reservation by sending an accept reply message to the TTCM.

17. A network switch for use in a method according to claim 16.

18. A computer network, in particular a large computer network comprising end systems and switches, for carrying out a method according to claim 16.

19. A method for establishing deterministic communication routes in a large computer network, wherein all affected end systems and switches of the computer network have a global time, the method comprising steps of:
generating a deterministic communication route on the basis of an existing communication route between two or more end systems of the computer network;
reserving, by a time-triggered connection manager (TTCM) of an end system, the deterministic communication route in a reservation phase by sending a reservation message to each network switch of the existing communication route up to a reservation commitment time (KZPT); and confirming, by the time-triggered connection manager (TTCM) of the end system, this deterministic communication route in an accept phase by sending an accept message to the network switches of the existing communication route before the KZPT;

wherein the TTCM modifies the reservation request on the basis of the information concerning the quality of the route and proposals for reducing the TVD received by the TTCM from the switches involved in the route and prompts further iterations in order to establish a time-controlled route via the same switches.

20. A TTCM for use in a method according to claim 19.

* * * * *